July 30, 1957 — O. R. SMITH — 2,800,867
PIPE REFORMING CLAMP
Filed Feb. 7, 1955 — 2 Sheets-Sheet 1
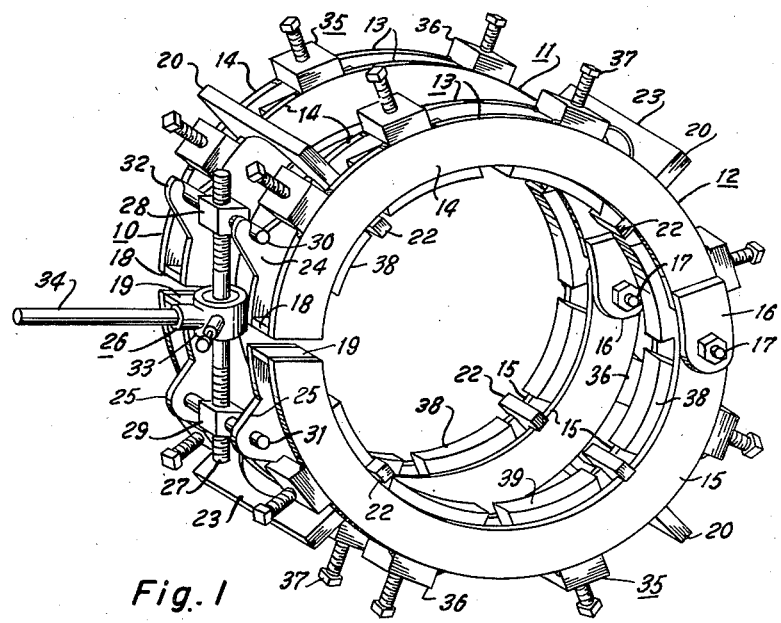
Fig. 1
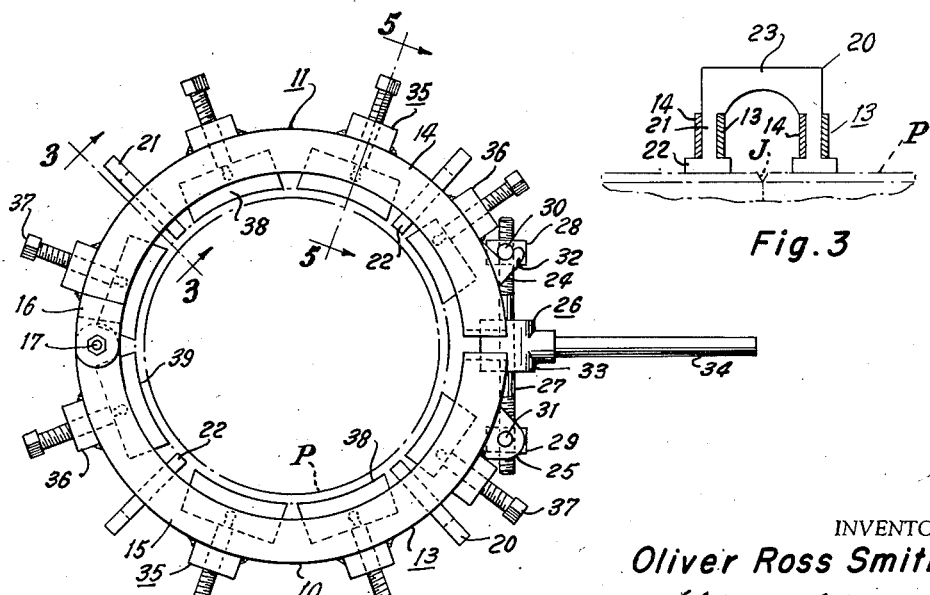
Fig. 2
Fig. 3
INVENTOR
Oliver Ross Smith
BY
ATTORNEYS July 30, 1957 O. R. SMITH 2,800,867
PIPE REFORMING CLAMP
Filed Feb. 7, 1955 2 Sheets-Sheet 2

INVENTOR
Oliver Ross Smith

BY *Ahley & Ahley*

ATTORNEYS

2,800,867

PIPE REFORMING CLAMP

Oliver Ross Smith, Fort Worth, Tex.

Application February 7, 1955, Serial No. 486,588

4 Claims. (Cl. 113—102)

This invention relates to new and useful improvements in pipe reforming clamps.

An object of the invention is to provide an improvement of the pipe reforming clamp shown in United States Letters Patent No. 2,632,417, issued to me on March 24, 1953.

One object of the invention is to provide an improved clamp for connecting the ends of pipe during welding thereof and having means for reforming said pipe ends to substantially circular shape so as to aline said pipe ends and facilitate welding thereof.

Another object of the invention is to provide an improved pipe reforming clamp having means for clamping the end portions of adjacent pipe ends and adjustable means carried by each clamping means for engaging each pipe end portion to reform the same to circular contour for alining said pipe ends.

A further object of the invention is to provide an improved pipe reforming clamp, of the character described, wherein the adjustable means includes a plurality of individual elements which are adjustable independently of each other.

A particular object of the invention is to provide an improved pipe reforming clamp, of the character described, wherein the clamping means include circular clamp sections spaced from each other to permit welding of the abutting pipe ends therebetween, the sections being connected by bridge means spaced from said pipe ends to facilitate access and the application of welding material thereto.

A construction designed to carry out the invention will be hereinafter described, together with other features of the invention.

Figure 4:
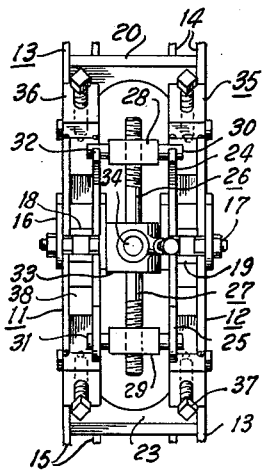
Figure 5:
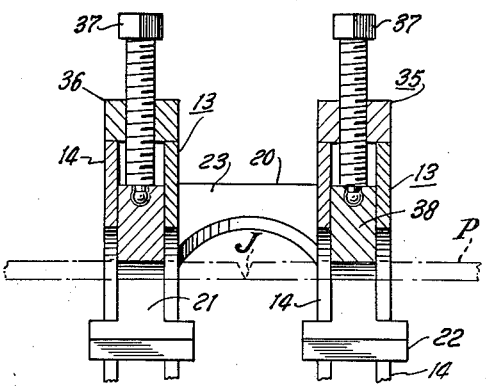
Figure 6:
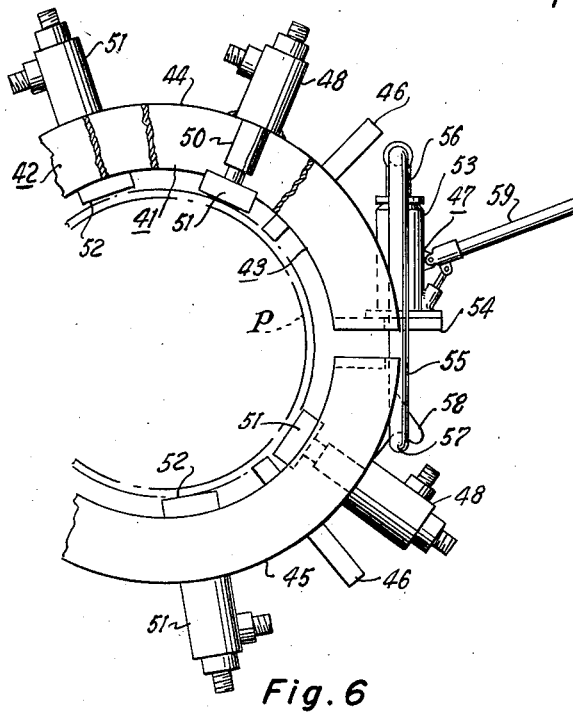
Figure 7:
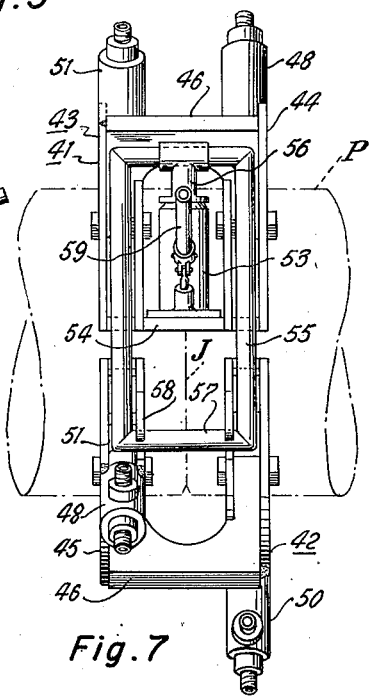

The invention will be more readily understood from a reading of the following specification and by reference to the accompanying drawings, wherein examples of the invention are shown, and wherein:

Fig. 1 is an isometric view of a pipe reforming clamp constructed in accordance with the invention, Fig. 2 is a side elevational view of the clamp, Fig. 3 is a cross-sectional view, taken on the line 3—3 of Fig. 2, showing one of the bridges, Fig. 4 is a front elevational view showing the fastening means for the clamp, Fig. 5 is a cross-sectional view, taken on the line 5—5 of Fig. 2, showing the adjustable elements, Fig. 6 is a side elevational view of a portion of a modified pipe reforming clamp, and Fig. 7 is a front elevational view of the modified clamp.

In the drawings, the numeral 10 designates a pipe reforming clamp embodying the principles of the invention and including a pair of annular sections 11 and 12. Each section is identical and has at least one and preferably a pair of annular, radial, spaced flanges or rings 13 formed by coacting pairs of arcuate, complementary segments 14 and 15. For pivotally connecting the segments of each ring to each other, a parallel lug 16 is welded or otherwise attached to and projects from the end of one segment in overlying relation to the adjacent end of the other segment and is fastened to the latter segment by a bolt and nut 17. Preferably, the segments 14 and 15 of each ring 13 are alined in a common plane in equally spaced relation to the segments of the other rings which are alined with each other in parallel planes whereby said segments are arranged in identical pairs or sets. The lugs 16 and bolts and nuts 17 coact to provide hinge connections between the ring segments and said hinged segments coact to form the annular clamp sections 11 and 12.

Cross bars or webs 18 and 19 may extend between and connect the free ends of the parallel pairs of segments 14 and 15, respectively, of each ring and are wholly confined within the margins of said segment ends. As shown most clearly in Fig. 3, the primary connection between each pair of rings 13 is provided by radial, transverse webs, bridges or gussets 20, of U-shape, having inwardly-extending arms or legs 21 confined between and welded or otherwise secured to the segments of said rings. An enlargement or foot 22 is formed on the inner end of each leg so as to underlie and space the inner arcuate margins of the ring segments from the pipe, shown by the broken lines P. Each bridge 20 has an outer cross head or web portion 23 extending between the outer ends of its legs 21 in spaced relation to the rings for connecting the clamp sections 11 and 12 in spaced relation. Due to the outward disposition of their web portions 23, the bridges do not interfere with access to the joint, shown by broken lines J, between the abutting ends of pipe connected by the clamp and the application of welding material thereto.

For detachably connecting the free ends of the clamp sections, external, radial lugs 24 and 25 are formed on the free end portions of one of the rings 13 of each annular clamp section in parallel, spaced pairs of engagement by a jack type fastener 26. Preferably, the lugs are mounted on the adjacent, inner rings of the clamp sections 11 and 12 in spaced relation to the adjacent, free ends of their segments 14 and 15. The fastener shown in Figs. 1–4 is of the screw type having a rod 27 extending tangentially of the sections, with one or both ends of the rod being screw-threaded for engagement with nuts 28 and 29. Pivot pins 30 and 31 project transversely from the nuts 28 and 29, respectively, for connection with the lugs 24 and 25. The pivot pins 31 are journaled in the lugs 25, while the lugs 24 are cut or recessed to provide keepers 32 for engagement by the pins 30. A ratchet 33, having a handle or lever 34, is mounted on the intermediate portion of the rod 27 for imparting rotation thereto so as to move the nuts and the free ends of the clamp sections toward each other. Manifestly, the clamp sections coact to clampingly confine adjacent pipe ends in abutting engagement.

Many pipe ends are deformed out of round so as to require reforming prior to welding. In order to reform the pipe ends to circular contour and hold said reformed ends in substantially perfect registration, a plurality of reforming assemblies or jacks 35 are carried by each clamp section 11 and 12. If desired, the reforming assemblies may be disposed in spaced pairs. At least one and preferably several reforming assemblies are provided for the parallel pairs of ring segments 14 and 15 of each section and may be mounted between said segments, the quantity of assemblies depending upon the diameters of the rings 13. Each assembly 35 includes a nut or block 36 overlying and welded or otherwise secured to the outer arcuate margins of the parallel pairs of segments of the rings of each section (Fig. 5). An adjusting element or screw 37 is reciprocally mounted in or screw-threaded through each nut 36 so as to extend radially inwardly between the rings. Although the inner ends of the screws 37 may engage the pipe, preferably, a shoe 38 is swivelly connected to each screw inner end for reciprocation between the rings of each section upon rotation of the screw. As shown in Figs. 1 and 2, it is desirable for the shoes to be elongated circumferentially of the clamp sections and to have arcuate, inner surfaces 39 conforming to the curvature of the pipe; however, the arcuate, amplified surfaces of the shoes are not essential. Manifestly, the pipe ends may be accurately reformed and held in circular contour during welding by adjustment of the screws of the assemblies.

A modified pipe reforming clamp 40 is shown in Figs. 6 and 7 and includes similar annular sections 41 and 42, rings 43, arcuate segments 44 and 45, bridges or gussets 46, a modified fastener 47 and modified reforming assemblies or jacks 48. Hydraulic cylinders 49 and reciprocal elements or plungers 50 are substituted for the nuts 36 and screws 37 of the assemblies 35. Instead of the shoes 38, relatively small shoes 51 are swivelled on the inner ends of the plungers 50 and have substantially flat surfaces 52 for engagement with the pipe P. As shown, the reforming assemblies of one section may be offset or staggered relative to the assemblies of the other assemblies. The modified fastener 47 includes a hydraulic cylinder or jack 53 mounted on a cross plate 54 extending between and projecting radially outward from the free ends of the segments 44 of the adjacent inner rings 43 of the clamp sections 41 and 42 whereby the jack extends tangentially between said sections. A bail 55 is pivotally connected to the piston rod 56 of the jack 53 and extends longitudinally of and on each side of said jack and beyond the plate 54 in overlying relation to the free ends of the segments 45. The bight portion or cross bar 57 of the bail is adapted to be engaged with recessed lugs or keepers 58, similar to the keepers 32, projecting radially outward from the end portions of the segments 45 of the adjacent inner rings 43 of the clamp sections. An operating handle or lever 59 is provided for actuating the jack 53 to eject its piston rod 56, whereby the clamp sections are closed into confining engagement with the pipe P when the cross bar of the bail 55 is engaged over the keepers 58. The pipe ends are reformed into circular contour and held in substantially perfect registration during welding by adjustment of the plungers 50 of the reforming assemblies 48.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A pipe reforming clamp including a pair of annular spaced sections having means for clamping the same in spaced relation around the adjacent ends of abutting pipes, transverse bridges connecting the outer margins of the sections, and independently adjustable pipe-engaging shoes carried by each section whereby the shoes of one section may be adjusted to reform the end of one pipe independently of the adjustment of the shoes around the other pipe end and of one another.

2. A pipe reforming clamp as set forth in claim 1 wherein each annular section includes a pair of spaced rings, the transverse bridges having inwardly-extending end portions connecting the rings of each section.

3. A pipe reforming clamp as set forth in claim 2 wherein the inwardly-extending end portions of the bridges terminate inwardly of the rings for engaging the pipes and spacing the rings therefrom.

4. A pipe reforming clamp as set forth in claim 2 wherein the pipe-engaging shoes are supported by and between the rings of each section and are disposed between the bridges and their inwardly-extending end portions.

References Cited in the file of this patent

UNITED STATES PATENTS

| | | |
|---|---|---|
| 1,693,064 | Tipton | Nov. 27, 1928 |
| 1,818,435 | Smith et al. | Aug. 11, 1931 |
| 1,969,572 | Maurer | Aug. 7, 1934 |
| 2,167,887 | Graham et al. | Aug. 1, 1939 |
| 2,308,340 | Newlon | Jan. 12, 1943 |
| 2,591,763 | Abegg | Apr. 8, 1952 |
| 2,632,417 | Smith | Mar. 4, 1953 |
| 2,674,966 | Morris | Apr. 13, 1954 |